United States Patent [19]
Kubo et al.

[11] Patent Number: 5,545,957
[45] Date of Patent: Aug. 13, 1996

[54] MOTOR SPEED CONTROLLER FOR SUPPRESSING SHAFT TORSION VIBRATION

[75] Inventors: Kenji Kubo; Rached Dhaouadi, both of Hitachi; Masahiro Tobise; Noboru Azusawa, both of Katsuta, all of Japan

[73] Assignee: Hitachi, Ltd., Tokyo, Japan

[21] Appl. No.: 185,613

[22] Filed: Jan. 24, 1994

[30] Foreign Application Priority Data

Jan. 21, 1993 [JP] Japan ............................. 5-008080

[51] Int. Cl.⁶ ........................................................ H02P 7/00
[52] U.S. Cl. ............................. 318/432; 318/254; 73/650
[58] Field of Search ..................................... 318/432, 138, 318/254, 808, 114, 128, 460, 433; 73/601, 650, 12.01, 649, 659, 862.34

[56] References Cited

U.S. PATENT DOCUMENTS

| | | | |
|---|---|---|---|
| 3,772,579 | 11/1973 | Stone et al. | |
| 3,917,989 | 11/1975 | Bereisa, Jr. | 318/138 |
| 4,166,377 | 9/1974 | Szabo et al. | 73/11 |
| 4,522,620 | 6/1985 | Leister | 494/10 |
| 4,862,749 | 9/1989 | Yagi | 73/650 |
| 4,971,522 | 11/1990 | Butlin | 318/808 |
| 5,126,641 | 6/1992 | Putman et al. | 318/128 |

FOREIGN PATENT DOCUMENTS 60-177906 9/1985 Japan.

OTHER PUBLICATIONS

Industrial Application Society, vol. 110, No. 4, pp. 410–417 (1990).

*Primary Examiner*—John W. Cabeca
*Attorney, Agent, or Firm*—Kenyon & Kenyon

[57] ABSTRACT

A motor controller includes a shaft torsion vibration estimator for estimating a shaft torsion vibration between a motor and a mechanical load and a shaft torque estimator for estimating a shaft torque acting upon a motor shaft, wherein a vibration in a mechanical load driving system is suppressed by utilizing an estimated shaft torsion torque value calculated by the shaft torsion vibration estimator and an estimated shaft torque value calculated by the shaft torque estimator in addition to a detected motor speed value. Using such a system stable speed control having improved response can be achieved since higher order vibration modes can be suppressed without deteriorating its shaft torsion vibration without deteriorating its shaft torsion vibration suppression performance by combining the shaft torsion vibration estimator and the shaft torque estimator.

12 Claims, 14 Drawing Sheets

MOTOR SPEED CONTROLLER FOR SUPPRESSING SHAFT TORSION VIBRATION

FIELD OF THE INVENTION

The present invention relates to a controller for a motor for driving a mechanical load, and more particularly to a motor speed controller suitable for suppressing a shaft torsion vibration in a mechanical load driving system and for controlling mechanical load speed with improved response.

DESCRIPTION OF RELATED ART

A shaft torsion vibration in a mechanical system becomes a problem when the response of speed control for a motor for driving a mechanical load is quickened. Such shaft vibration not only increases the speed fluctuation in mechanical load, but also induces a failure in a motor-driven system. Therefore, a vibration suppressing control is indispensable to realize a speed control having an improved response.

With regard to the prior art of shaft torsion vibration suppression control, a method is disclosed in Japanese Patent Application Laid-Open No.60-177906 (1985). In this controller, the shaft torsion vibration of the connecting shaft between a motor and a mechanical load is approximated with a vibration characteristic of a two mass system where two moments of inertia are connected to each other with a spring having a given rigidity. In this arrangement, the vibration of the mechanical system is expressed by a shaft torsion torque between the motor and the mechanical load and by the vibration in a mechanical load velocity, by the detection of which and by the compensating of a torque current command value for the motor the vibration can be suppressed. A motor speed is readily detectable, but a shaft torsion torque and a mechanical load velocity are generally undetectable. Therefore, there is provided a shaft torsion vibration estimator based on the two mass system vibration model to estimate a shaft torsion torque and a mechanical load velocity. In the prior art described above, these estimated values are used to suppress the mechanical vibration.

With regard to suppressing the vibration by means of estimating only the shaft torsion torque, a method is disclosed in The Transactions of The Institute of Electrical Engineers of Japan, A Publication of Industrial Application Society, Vol.110, No.4, pages 410 to 417 (1990). In this method, the shaft torsion torque between the motor and the mechanical load is assumed to be the shaft torque acting on the motor shaft, with which the torque current is compensated to suppress the mechanical vibration. Therein, the shaft torque is estimated as a component of the motor driving torque, namely, a load torque acting on the motor shaft, which is not used in an acceleration torque of the motor.

In addition to the shaft torsion vibration in the connecting shaft between the motor and the mechanical load, the mechanical load driving system is, however, excited to cause vibration in gears and/or a coupling for transmitting the motor driving torque to the mechanical load. The vibration is called a higher order mode vibration since it has a higher oscillation frequency than that of the shaft torsion vibration in the connecting shaft, which appears when the response of speed control becomes quicker. In this mode, vibrations occur between the motor and the gear, and between the motor and the coupling. The conventional shaft torsion vibration estimator based on the two mass system vibration model estimates only the shaft torsion torque of the connecting shaft in the shaft torque components of the mechanical vibration. The higher order vibration, therefore, cannot be suppressed even when it takes place. As a result, the shaft torsion vibration suppression can be performed only within a limited region of speed response where a higher order mode vibration is not excited.

On the other hand, in the method where the torque current is compensated by estimating a shaft torque acting on the motor shaft, an estimated torque contains not only a shaft torsion torque component, but also a torque component of the higher order mode vibration. Since the vibration mode of the shaft torsion vibration differs from that of the higher order vibration, they need to be separated to compensate the torque current. That is, in order to suppress the shaft torsion vibration, the torque current command value for the motor is compensated using the shaft torsion torque such as to suppress the vibration in the mechanical load side. On the other hand, in order to suppress the higher order vibration, the torque current command value for the motor is compensated such as to suppress the vibration in the motor side. However, when the compensation is performed using an estimated shaft torque value in which the shaft torsion torque component is coexisting with the higher order vibration torque component, the higher order vibration is, in some cases, more excited with suppressing the shaft torsion vibration. For this reason, the suppression of shaft torsion vibration having a successful response cannot be attained.

SUMMARY OF THE INVENTION

Heretofore, the problems associated with the prior art motor speed controller for a motor-driven system have been described. The present invention is to provide a motor speed controller which is capable of controlling a mechanical load with improved response and minimized vibration by means of suppressing not only the shaft torsion vibration between the motor and the mechanical load, but also the vibration due to the higher order vibration mode contained in the driving system.

The present invention attains this improved motor speed controller by providing a shaft torsion vibration estimator to estimate a shaft torsion torque based on the two mass system vibration model using a motor torque current and a motor speed, and a shaft torque estimator to estimate a load torque acting on the motor shaft using the motor torque current and the motor speed.

The shaft torsion vibration estimator estimates a shaft torsion torque component in the frequency region not affected by the higher order mode vibration. The shaft torque estimator estimates a shaft torque from the shaft torsion torque component containing the torque component due to the higher order vibration. Using both of the estimated values, the compensation can be performed by means of separating the shaft torsion torque component between the motor and the mechanical load and the torque component due to the higher order mode vibration.

By means of compensating the torque current command value using an estimated shaft torsion torque value calculated with the shaft torsion vibration estimator, the shaft torsion vibration between the motor and the mechanical load can be suppressed. Further, by means of combining the estimated shaft torsion vibration value and the estimated shaft torque value, the estimated value for the torque component due to only the higher order mode vibration can be calculated. By using these estimated values, the torque current command value having been compensated with the estimated shaft torsion torque value is further compensated, which can eliminate the effect of the higher order mode vibration acting on the motor shaft. With the manner described above, the shaft torsion vibration can be suppressed and the vibration due to the higher order mode vibration can be also suppressed.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

Figure 1:
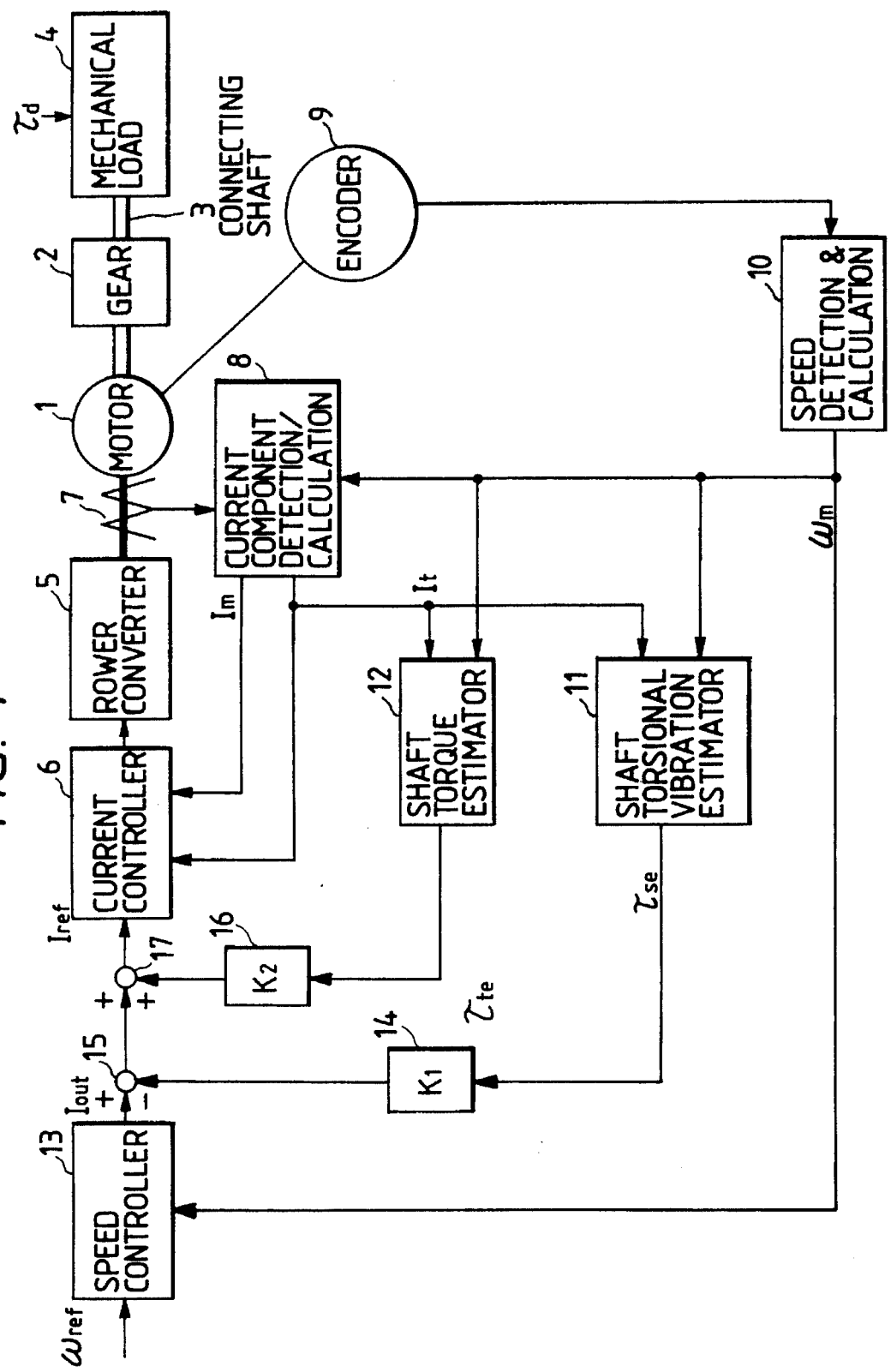
FIG. 1 is a block diagram of a motor speed control system of a first embodiment of the invention.

A first embodiment according to the present invention will be described below, referring to FIG. 1. A gear 2 and a connecting shaft 3 for transmitting torque are connected to a motor 1 to drive a mechanical load 4. A load torque $\tau_d$ acts on the mechanical load 4. The motor is of induction type and is driven with a power converter 5. The motor current detected with a current detector 7 is separated into two components with a current detecting/calculating unit 8, and is detected as a torque current component $I_t$ which is proportional to the motor driving torque $\tau_m$ and the exciting current component $I_m$ which is perpendicular to the torque current component. A current controller 6 performs vector control using these detected current values in such a manner that the current controller generates the driving torque $\tau_m$ according to a motor torque current command value $I_{ref}$. In order to detect speed, the motor 1 is provided with an encoder 9 which outputs a pulse row having a frequency proportional to the rotating speed. A speed detecting/calculating unit 10 detects the motor speed $\omega_m$ using the pulse row.

A motor speed control system comprises a shaft torsion vibration estimator 11, a shaft torque estimator 12, a speed controller 13, constant multipliers 14 and 16, and adders 15 and 17. The shaft torsion vibration estimator 11 calculates an estimated shaft torsion torque value $\tau_{se}$ from the detected torque current value $I_t$ and the detected speed value $\omega_m$ based on the two mass system vibration model. The shaft torque estimator 12 calculates an estimated shaft torque value $\tau_{te}$ by use of the detected torque current value $I_t$ and the detected speed value $\omega_m$. The speed controller 13 performs speed control with proportional integration compensation using the speed command value $\omega_{ref}$ and the detected motor speed value and calculates a torque current command value $I_{out}$. The estimated shaft torsion torque value $\tau_{se}$ calculated with the shaft torsion vibration estimator 11 is multiplied with a constant ($k_1$) with a constant multiplier 14. Then, the multiplied value is subtracted from the torque command value $I_{out}$ with the adder 15. On the other hand, the estimated shaft torque value $\tau_{te}$ calculated with the shaft torque estimator 12 is multiplied with a constant ($k_2$) with a constant multiplier 16. Then, the multiplied value is added to the output of the adder 15 with the adder 17. This output is the motor torque current command value Ief for the current controller 6.

Figure 2:
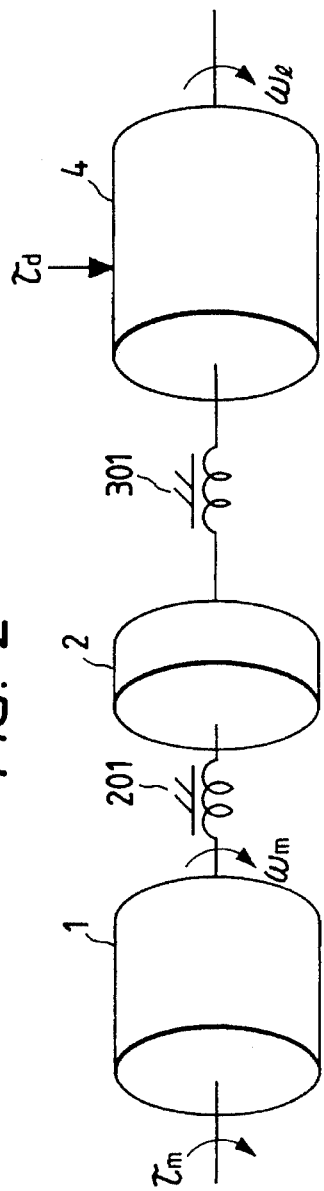
FIG. 2 is a schematic diagram illustrating a vibration model of a mechanical load driving system.
Figure 3:
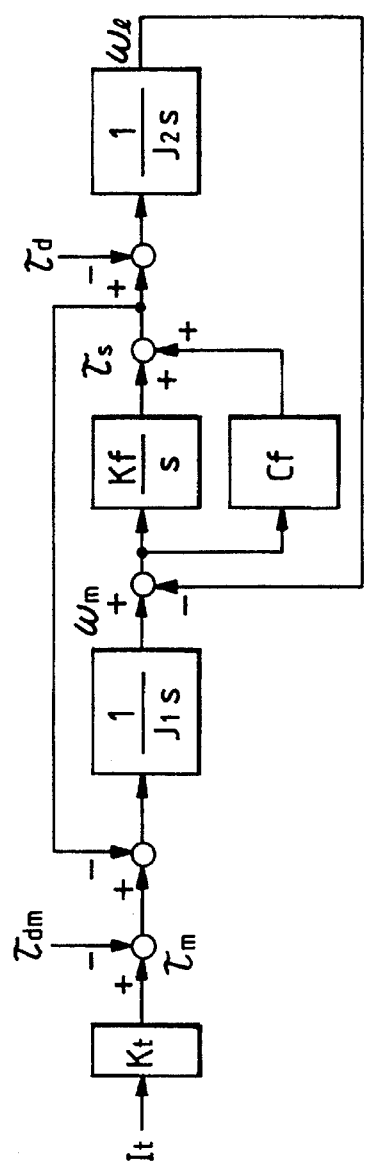
FIG. 3 is an equivalent block diagram of the vibration model.

The shaft torsion estimator 11 and the shaft torque estimator 12 are constructed as follows. A vibration model used for constructing each of the estimators is shown in FIG. 2. An inertia of motor 1 and an inertia of gear 2 are connected with a spring 201, and the inertia of gear 2 and a mechanical load 4 are connected with a spring 301. $\tau_m$ indicates the driving torque of the motor, $\omega_m$ indicating the speed of the motor, $\omega_1$ indicating the speed of the mechanical load, $\tau_d$ indicating the load torque acting on the mechanical load. Under a shaft torsion vibrating condition, the motor 1 and the mechanical load 4 are oscillating through the spring 301. In a higher frequency, a higher order vibration mode is excited to cause oscillation between the motor 1 and the gear 2 through the spring 201. FIG.3 shows an equivalent block diagram for the vibration model. Therein, $I_t$ indicates the motor torque current, $\tau_s$ indicating the shaft torsion torque, $\tau_{dm}$ indicating the torque component acting on the motor shaft due to the higher vibration mode, and the other variables are the same as in FIG.2. $J_1$ indicates the moment of inertia of the motor, $J_2$ indicating the moment of inertia of the mechanical load, $K_f$ indicating the shaft torsion rigidity, $c_f$ indicating the damping constant for the shaft torsion.

The construction of the shaft torsion estimator derived from the equivalent block diagram shown in FIG.3 will be described below. Here the higher vibration mode between the motor 1 and the gear 2 appears only in a frequency region higher than the shaft torsion vibration, and can be neglected in a low frequency region to evaluate the shaft torsion vibrating condition. With putting $\tau_{dm}=0$ in the equivalent block diagram of FIG.3, the shaft torsion torque will be evaluated based on the vibration model. It is well known that the dynamic characteristic of the vibration model can be described by an equation of state, with which a state estimator to estimate non-detectable state variables can be constructed. The equation of state describing the shaft torsion vibration is as follows.

$$\frac{d}{dt} x = A \cdot x + B \cdot u \qquad \text{[Equation 1]}$$

$$y = C \cdot x, \qquad \text{(Equation 1)}$$

where x is the state variable vector expressing vibration state, u being the input variable, y being the output variable, A, B, C being the matrixes of coefficients, which are expressed as follows.

[Equation 2]

$$x = [\omega_m \, \tau_s \, \omega_1 \, \tau_d]',$$

$$u = I_t,$$

$$y = \omega_m,$$

(Equation 2)

where the symbol ' indicates the transposed matrix, the matrixes of coefficients A, B and C being given by the following equations.

$$A = \begin{bmatrix} -c_f/J_1 & -1/J_1 & c_f/J_1 & 0 \\ K_f & 0 & -K_f & 0 \\ c_f/J_2 & 1/J_2 & -c_f/J_2 & -1/J_2 \\ 0 & 0 & 0 & 0 \end{bmatrix}$$

[Equation 3]

$$B = [K_t/J_1 \, 0 \, 0 \, 0]',$$
$$C = [\, 1 \, 0 \, 0 \, 0\,].$$

(Equation 3)

Therein, it is supposed that the load torque $\tau_d$ changes step-wise, and then $d/dt(\tau_d)=0$.

Using these above equations, the state estimator will be constructed as follows. The state variables $\omega_m$, $\tau_s$, $\omega_1$ and $\tau_d$ expressing the vibrating state change with mutual dependence. Therefore, a minimum dimensional state estimator to estimate the $\tau_s$, $\omega_1$ and $\tau_d$ using the detected values $I_t$ and $\omega_m$ as inputs is constructed to calculate an estimated shaft torsion torque value $\tau_{se}$ as one of the estimated outputs. The minimum dimensional estimator carries out calculation as follows.

[0021]

$$\frac{d}{dt} z = A_r \cdot z + B_r \cdot I_t + G_r \cdot \omega_m$$

[Equation 4]

$$x_e = z + K_r \cdot \omega_m,$$

(Equation 4)

where z is the variable vector of a minimum dimensional state observer, $x_e$ being the variable vector expressing the estimated variables $\tau_{se}$, $\omega_{le}$ and $\tau_{de}$, $K_r$ being the estimated gain vector to determine the response for state estimation. Each of the variable vectors consist of the following equations.

[Equation 5]

$$z = [z_1 z_2 z_3]',$$

$$x_e = [\tau_{se} \omega_{le} \tau_{de}]',$$

(Equation 5)

$$K_r = [k_{r1} k_{r2} k_{r3}]',$$

where $\tau_{se}$ is the estimated shaft torsion torque value, $\omega_{le}$ being the estimated mechanical load speed value, $\tau_{de}$ being the estimated load torque value acting on the mechanical load. And $A_r$, $B_r$ and $G_r$ are the matrixes of coefficients given by the following equations.

[Equation 6]

$$A_r = A_{22} - K_r \cdot A_{12},$$

$$B_r = B_2 - K_r \cdot B_1,$$

(Equation 6)

$$G_r = A_r \cdot K_r + A_{21} - K_r \cdot A_{11},$$

where $A_{11}$, $A_{12}$, $A_{21}$, $A_{22}$, $B_1$ and $B_2$ are given by the matrixes of coefficients for A and B as the following equations.

$$A_{11} = -c_f/J_1, \, A_{12} = [-1/J_1 \, c_f/J_1 \, 0],$$

[Equation 7]

$$A_{21} = \begin{bmatrix} K_f \\ c_f/J_2 \\ 0 \end{bmatrix},$$

$$B_1 = K_t/J_1, \, B_2 = [0 \, 0 \, 0]'$$

(Equation 7)

$$A_{22} = \begin{bmatrix} 0 & -K_f & 0 \\ 1/J_2 & -c_f/J_2 & -1/J_2 \\ 0 & 0 & 0 \end{bmatrix},$$

Then, in order to estimate the state variables in the appropriate frequency region, the estimating gain vector $K_r$ in the minimum dimensional state estimator is adjusted. The shaft torsion vibration estimator 11 executes calculation according to the minimum dimensional state estimator asymptotically to estimate the estimated shaft torsion torque value $\tau_{se}$.

Figure 4:
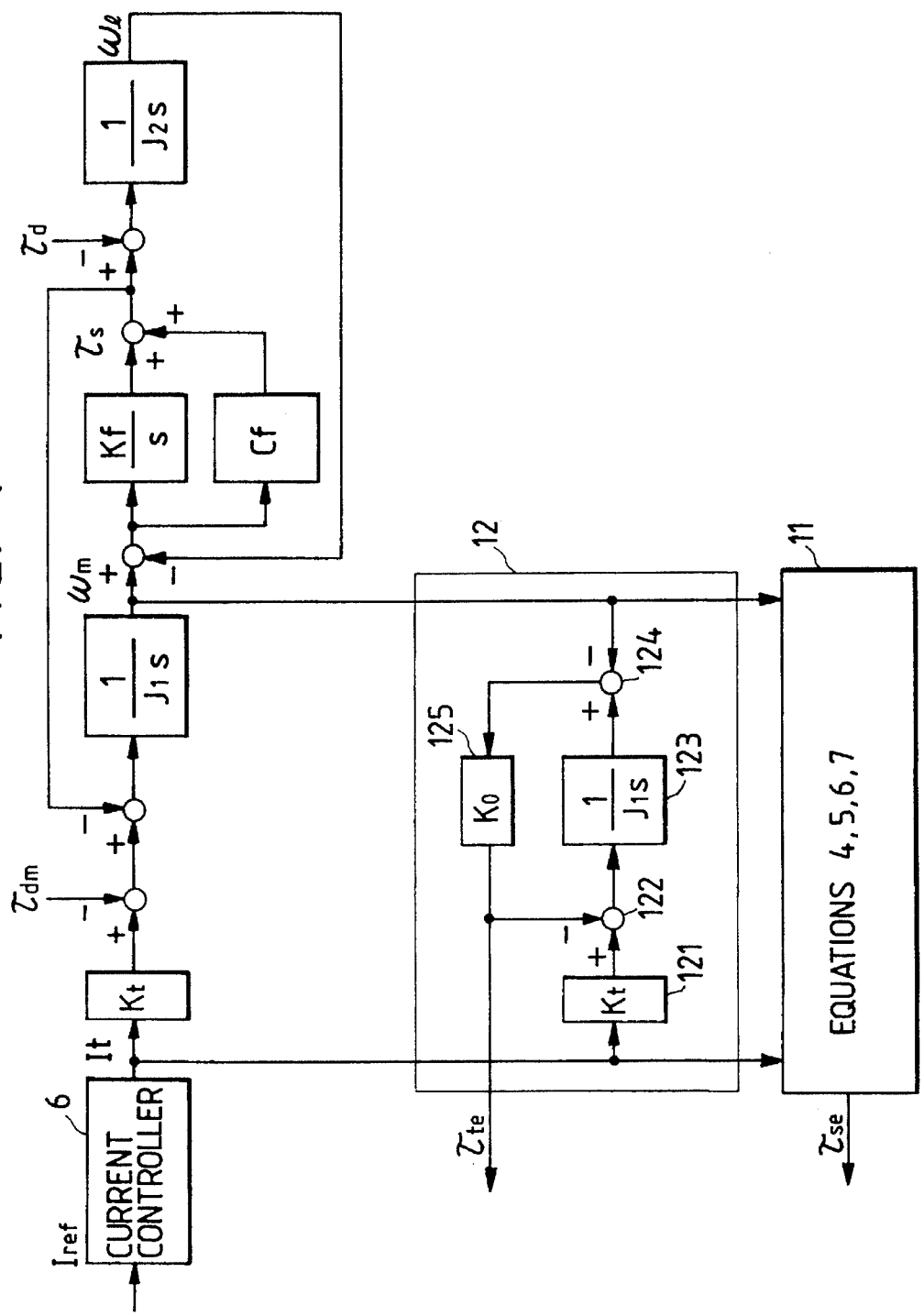
FIG. 4 is a block diagram showing the constructions of a shaft torsion vibration estimator and a shaft torque estimator.

FIG. 4 shows the construction of the shaft torque estimator 12. Therein, the equivalent block diagram for expressing the vibration model of the mechanical system is the same as that of FIG. 3, and the shaft torsion vibration estimator 11 expressed by the Equations 4, 5, 6 and 7 is described in the figure. In FIG. 4, $K_t$ and $J_1$ are the constant coefficients corresponding to the torque constant of the motor driving system and the moment of inertia of the motor, $k_0$ being the estimated gain to determine the response of estimated shaft torque. And s is Laplace operator, 1/s indicating integration. In the shaft torque estimator 12, the torque current $I_t$ is multiplied by the torque constant $K_t$ with a constant multiplier 121, and is subtracted by the estimated shaft torque value $\tau_{te}$ calculated from the output described above with an adder 122. The result is integrated with an integrator 123 having a gain of $1/J_1$. The difference between this result and the detected motor speed $\omega_m$ is calculated with an adder 124, and the result is multiplied by the estimated gain $k_0$ with a constant multiplier 125. The estimated shaft torque value ire is calculated in result. That is, the estimated torque value $\tau_{te}$ is asymptotically calculated from the detected values $I_t$ and $\omega_m$, and the frequency band region for estimating the shaft torque is adjusted with the estimated gain $k_0$. It can be understood from the relationship between the equivalent block diagram for the vibration model shown in FIG. 4 and the shaft torque estimator 12 that the value $\tau_{te}$ contains the disturbance shaft torque component $\tau_{dm}$ due to the higher order mode as well as the shaft torsion torque component $\tau_s$. Therein, the estimated gain $k_0$ is set high enough to be able to estimate the disturbance shaft torque component $\tau_{dm}$ appearing at a high frequency region using a proper response.

By combining the shaft torsion vibration estimator 11 and the shaft torque estimator 12 described above, the shaft torsion torque component and the torque component due to higher order vibration mode can be compensated separately. That is, the torque current command value $I_{ref}$ compensated with outputs from the shaft torsion vibration estimator and from the shaft torque estimator can be expressed by the following equation.

[Equation 8]

$$I_{ref} = I_{out} - k_1 \cdot \tau_{se} + k_2 \cdot \tau_{te},$$

(Equation 8)

where $I_{out}$ is the output from a speed controller 13 executing proportional integral compensation, $k_1$ and $k_2$ being the compensating gains to suppress vibration. And the estimated shaft torque value $\tau_{te}$ can be considered as the sum of the estimated shaft torsion torque value $\tau_{se}$ and the estimated disturbance shaft torque value $\tau_{dme}$ due to higher order mode.

[Equation 9]

$$\tau_{te} = \tau_{se} + \tau_{dme}. \qquad \text{(Equation 9)}$$

The following equation can be obtained by inserting the above equation into Equation 8.

[Equation 10]

$$I_{ref} = I_{out} - (k_1 - k_2) \cdot \tau_{se} + K_2 \cdot \tau_{dme}. \qquad \text{(Equation 10)}$$

It can be understood from the above equation that the estimated shaft torsion torque value $\tau_{se}$ and the estimated disturbance shaft torque value $\tau_{dm}$ can be independently compensated by means of properly setting the compensating gains $k_1$ and $k_2$ which can be separately set.

Figure 5A:
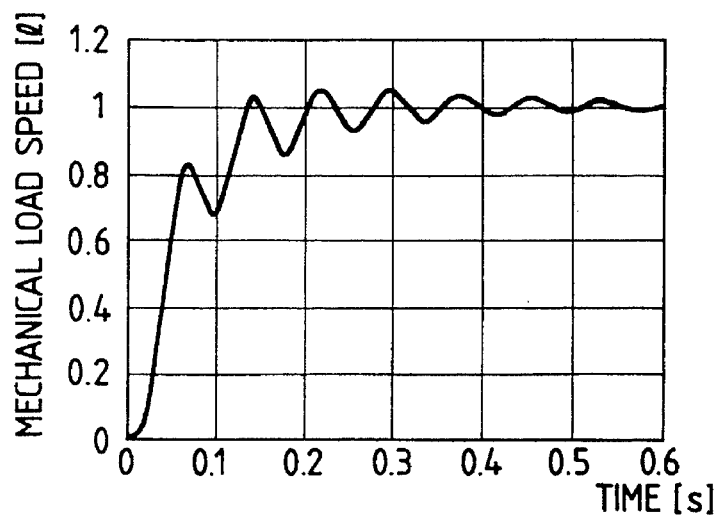
FIGS. 5(a) to 5(c) speed control characteristics indicative of the effects according to the present invention.
Figure 5B:
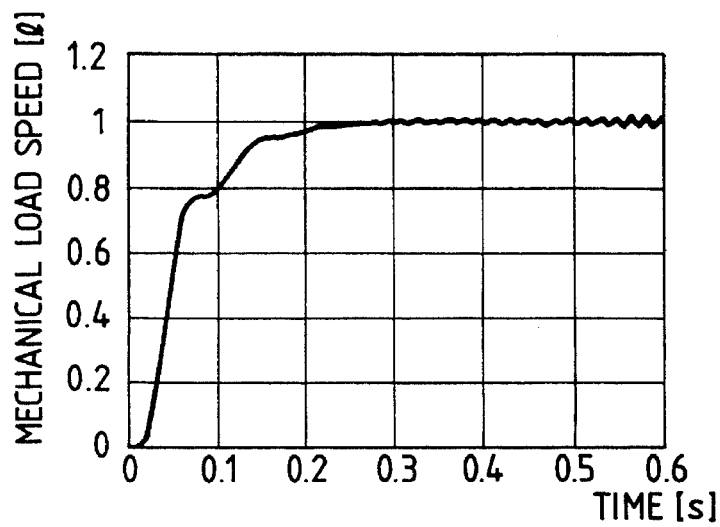
Figure 5C:
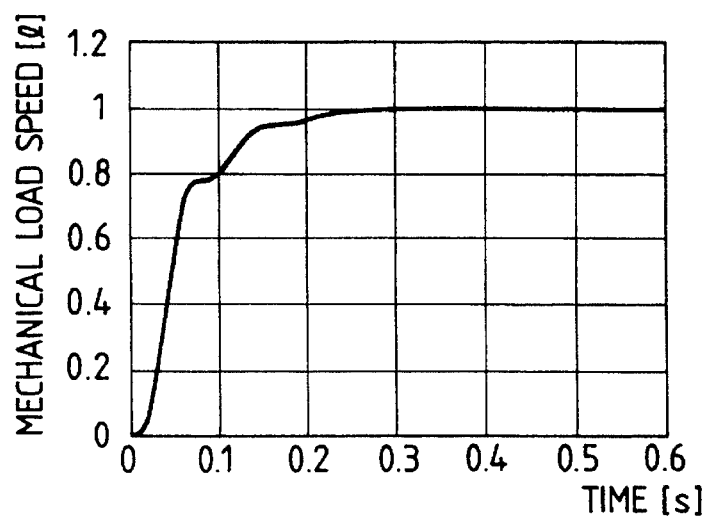

FIGS. (5a) to 5(c) show the simulation results expressing the effect of the embodiment according to the present invention. The figure shows the time responses of mechanical load speed in the construction shown in FIG. 1 when the speed command value $\omega_{ref}$ is changed step-wise. Therein, a three mass system vibration model shown in FIG. 2 is applied to the mechanical system. FIG. 5(a) shows a result where both of the compensating gains $k_1$ and $k_2$ are zeros, which corresponds to a proportional integral control for a motor using only the speed controller 13. The mechanical load speed is responding with shaft torsion vibration to the step change of the speed command value. In this case, the higher order vibration is not excited. FIG. 5(b) shows a result where only the gain $k_2$ is set to be zero and the speed control is carried out using the shaft torsion vibration estimator 11. Therein, the proportional integral gain of the speed controller 13 is set at the same value as in the case of (a), the estimated shaft torsion torque value $\tau_{se}$ calculated with the shaft torsion vibration estimator 11 being multiplied with the compensating gain $k_1$, the result is subtracted from the output of the speed controller 13. It can be understood from the response wave-form in FIG. 5(b) that although the shaft torsion vibration at the step change of the speed command value has been suppressed, there exists a continuous high frequency oscillation. This oscillating frequency corresponds to the resonance frequency of the higher order vibration mode. This result shows that in some cases where a shaft torsion vibration suppression based on the two mass system vibration model is applied, a higher order vibration mode is excited and suppression of the shaft torsion vibration cannot be sufficiently attained. FIG. 5(c) shows a result of vibration suppression according to the present invention. Therein, the compensating gain $k_2$ is set such as to compensate the torque component due to the higher order vibration, and the compensating gain $k_1$ is set such that $(k_1 - k_2)$ is equal to the compensating gain $k_1$ in the case of (b). It can be understood from the response wave-form for the mechanical load speed in FIG. 5(c) that the shaft torsion vibration can be suppressed without exciting higher order vibration mode.

Figure 6A:
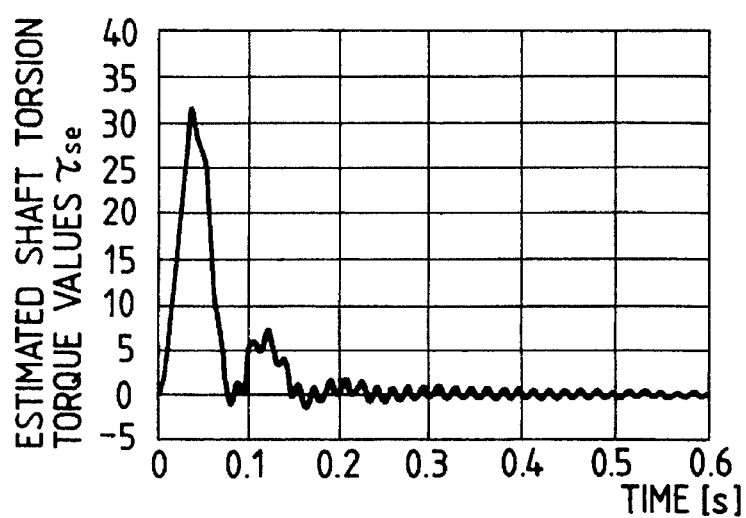
FIGS. 6(a) to 6(c) wave-form charts showing operation of the present invention.
Figure 6B:
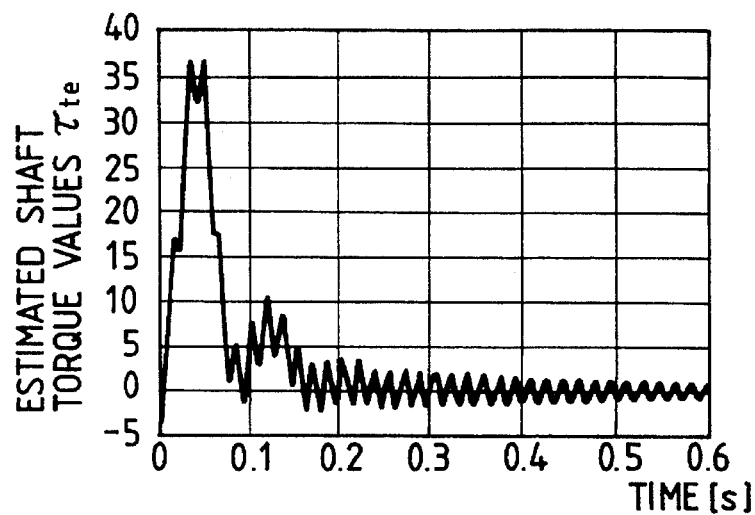
Figure 6C:
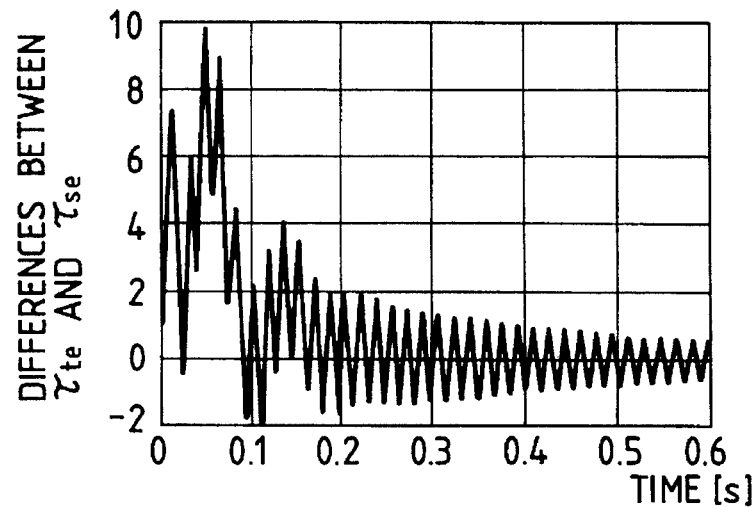

FIG. 6 shows the operating wave-forms of the estimated shaft torsion torque value $\tau_{se}$, the estimated shaft torque value $\tau_{te}$ and the difference between $\tau_{te}$ and $\tau_{se}$ (this corresponds to the estimated disturbance shaft torque $\tau_{dme}$ due to higher order vibration mode) which are described in FIG. 5(c). The estimated shaft torsion torque value $\tau_{se}$ in FIG. 6(a) correctly expresses the behavior of the shaft torsion torque at step changed speed response. And higher order vibration component is slightly contained in the shaft torsion torque because of the effect of higher order vibration mode. On the other hand, the estimated shaft torque value $\tau_{te}$ in FIG. 6(b) is estimated as the value containing both the shaft torsion torque component and the torque component due to higher order vibration mode. The torque component due to higher order vibration mode can be extracted by means of making the difference between τte and $\tau_{se}$ which is shown in FIG. 6 (c). Therefore, the shaft torsion vibration and the higher order vibration mode can independently be suppressed by means of combining the estimated values in (a) and (b), that is, the shaft torsion vibration can be suppressed using the estimated shaft torque value in (a) and the higher order vibration mode can be suppressed using the disturbance torque component in (c).

According to the present invention as described in detail above, the shaft torsion torque component and the torque component due to higher order vibration mode can be separately compensated by means of combining a shaft torsion vibration estimator and a shaft torque estimator. Therewith, since the shaft torsion vibration is suppressed without exciting higher order vibration mode, the shaft torsion vibration suppression control with improved response can be attained. Further, by means of suppressing higher order vibration mode, the effect of limit cycle due to the gear back-rush characteristic can be decreased. Furthermore, the shaft torsion vibration estimator and the shaft torque estimator independently carry out calculation using the motor current and the motor speed as inputs. Since vibration suppression is performed with compensating the current command value by means of multiplying each of the outputs by each of coefficients, there is an advantage in that adjustment of the control system can be easily carried out.

Figure 7:
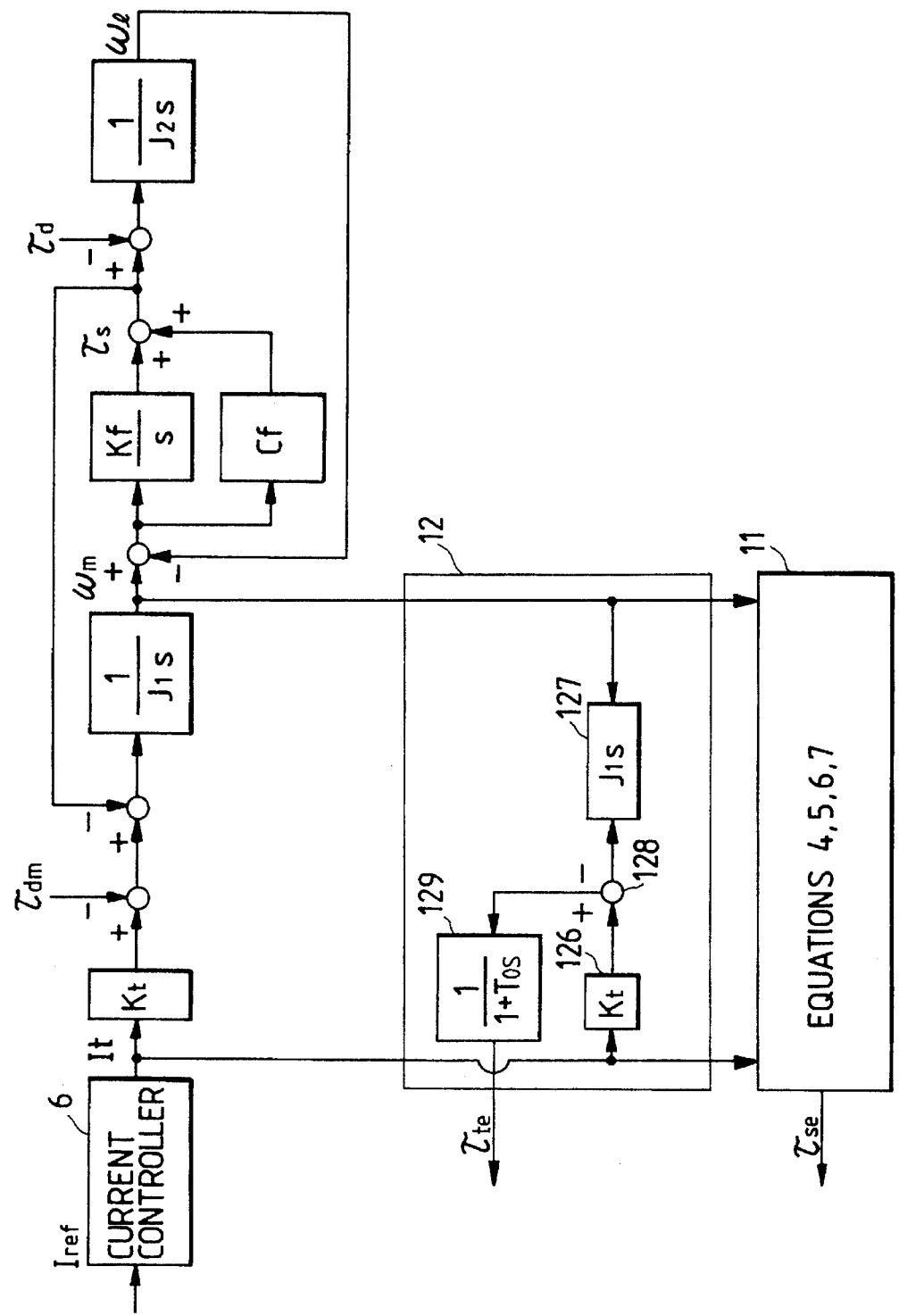
FIG. 7 is a block diagram showing the construction of a shaft torque estimator of a second embodiment of the invention.

FIG. 7 shows a second embodiment according to the present invention where a shaft torque estimator of different construction is employed. Only the construction of the shaft torque estimator 12 is different from that of the first embodiment (FIG. 4). In the shaft torque estimator 12, $K_t$ is the torque constant, $J_1$ being the moment of inertia of the motor, $T_0$ being the first-order time lag, s is Laplace operator which denotes differentiation. Firstly, the motor current $I_t$ is multiplied by the torque constant $K_t$ with a constant multiplier 126. On the other hand, the motor speed $\omega_m$ is differentiated with a differentiator 127 having a gain of $J_1$. The output from the constant multiplier 126 is subtracted by the output from the differentiator 127 with an adder 128. This result is input to a calculator 129 having first order time-lag of $T_0$ to calculate an estimated shaft torque value $\tau_{te}$ as an output. Therein, the output of the differentiator 127 corresponds to a motor acceleration torque. A shaft torque can be calculated as the result of subtracting the acceleration torque from the driving torque calculated as the output of the constant multiplier. The shaft torque is input to the first order time lag calculator 129 to calculate a estimated shaft torque value in the frequency band corresponding to the inverse of the time lag of $T_0$. in this embodiment, the estimated shaft torque value is directly calculated every moment using the differentiator and the first order time lag calculator. Therefore, this embodiment has an advantage that the method is adapted to digital calculation comparing to the method of the first embodiment in which the estimated shaft torque value is asymptotically estimated with the closed circuit.

Figure 8:
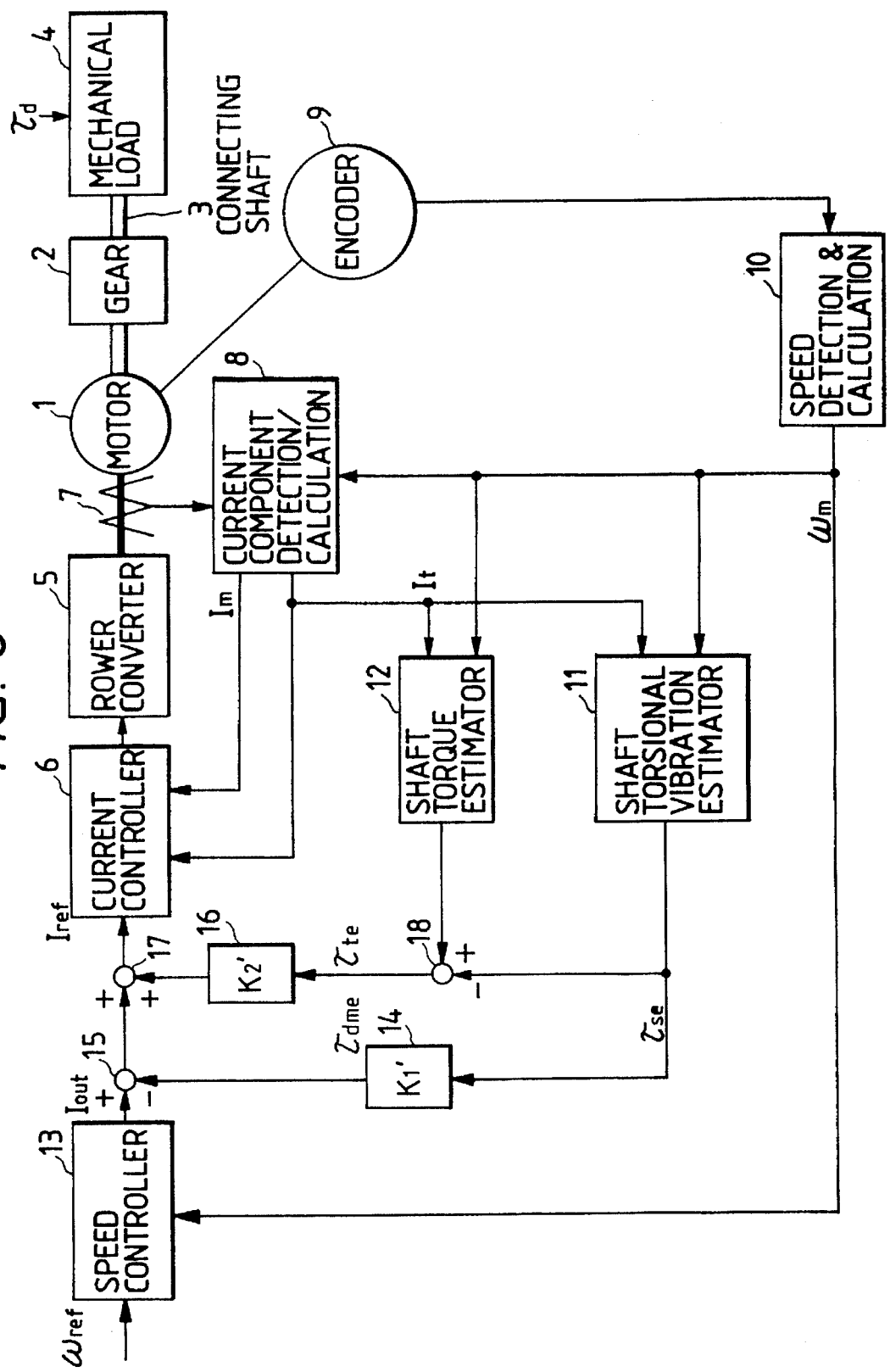
FIG. 8 is a block diagram of a motor speed control system of a third embodiment of the invention.

FIG. 8 shows the construction of a third embodiment according to the present invention. The difference from the first embodiment shown in FIG. 1 is that there is additionally provided an adder 18 to calculate the difference between $\tau_{te}$ calculated by the shaft torque estimator 12 and $\tau_{se}$ calculated by the shaft torsion vibration estimator 11. The output from the adder 18 is the torque component which is obtained by subtracting the shaft torsion torque component from the shaft torque component, and is corresponding to the estimated value $\tau_{se}$ for the disturbance shaft torque component acting on the motor shaft due to the higher order vibration mode. The compensating gain $k_1'$ is multiplied to the estimated shaft torsion torque value $\tau_{se}$ with a constant multiplier 14, and the result is subtracted from the output $I_{out}$ of a speed controller 13 with an adder 15 to suppress the shaft torsion vibration. The compensating gain $k_2'$ is multiplied to the estimated disturbance shaft torque value $\tau_{dem}$ calculated by the adder 18 with a constant multiplier 16, and the result is added to a current command value with an adder 17 to eliminate the torque component due to the higher order vibration. With these functions, the shaft torsion vibration can be suppressed without exciting the higher order vibration mode. This embodiment has an advantage that the adjustment of the control constants is easy since the two compensating gains $k_1'$ and $k_2'$ can be independently set.

Figure 9:
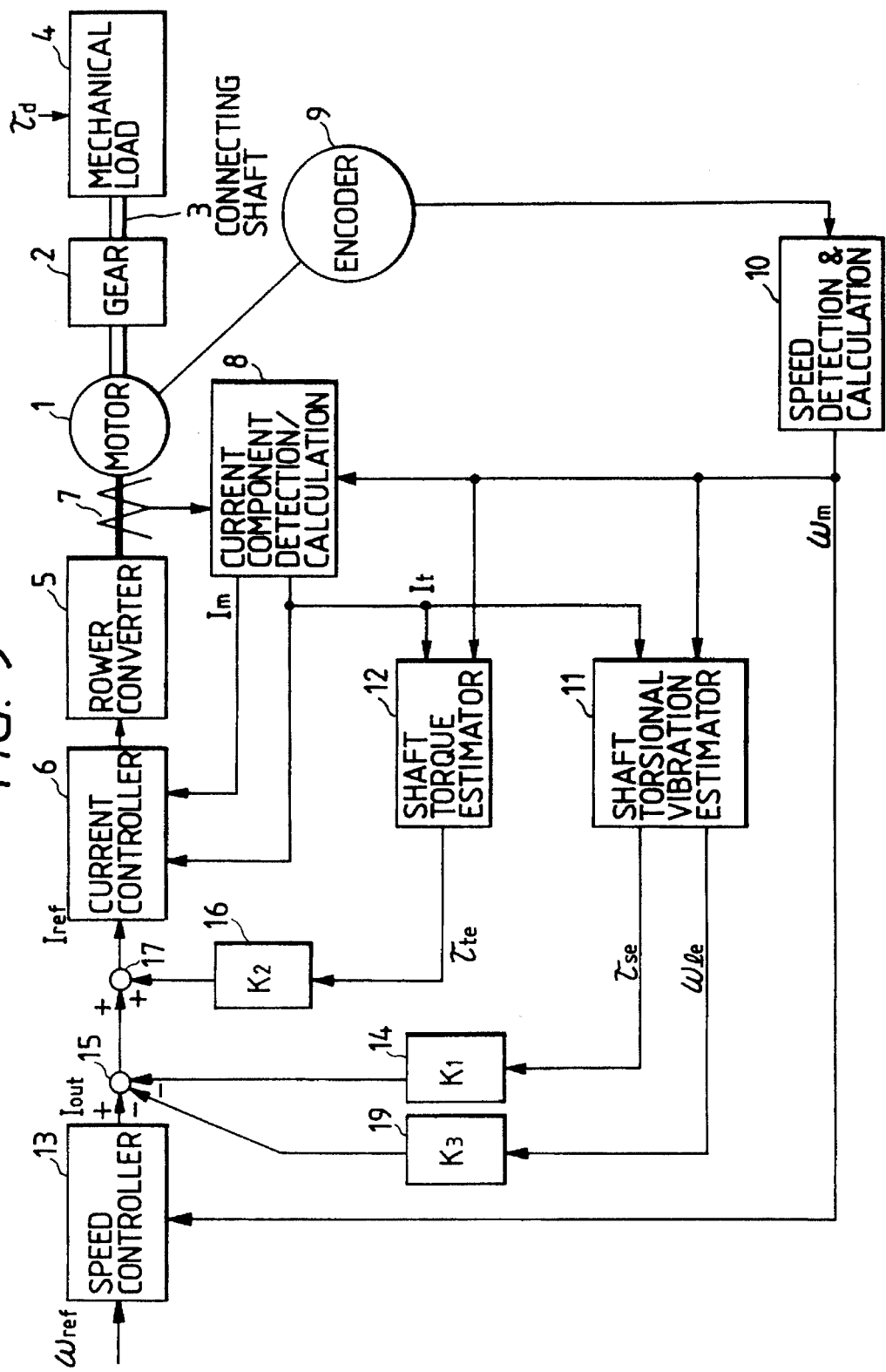
FIG. 9 is a block diagram of a motor speed control system of a fourth embodiment of the invention.

FIG. 9 shows a fourth embodiment according to the present invention. The difference from the first embodiment in FIG. 1 is that the shaft torsion vibration estimator 11 outputs not only the shaft torque but also the estimated value $\omega_{le}$ for the speed of mechanical load side to use these values for compensating the current command value. The shaft torsion vibration estimator 11 estimates each of the state variables for the vibration model in FIG. 3 shown by Equation 4. That is, the state variables are asymptotically estimated by means of interrelating the shaft torsion torque, the mechanical load speed and the load torque. Therefore, the vibration can be suppressed using a shaft torsion vibration estimator having the same construction as that in the first embodiment. In FIG. 9, a constant multiplier 19 multiplies the compensating gain $k_3$ with the estimated value $\omega_{le}$, and the result is subtracted from the current command value with an adder 15 to obtain a new compensating value for $I_{out}$. By this way a speed control having better characteristics can be achieved, since the shaft torsion vibration in the mechanical load is suppressed using not only the shaft torsion torque but also the estimated value for the mechanical load speed. Therein, the torque component due to higher order vibration mode can be compensated separating from the shaft torsion vibration suppression as well as in the first embodiment. This embodiment has an advantage in that a shaft torsion vibration suppression control having a better response can be attained with keeping the suppression effect for the higher order vibration mode.

Figure 10:
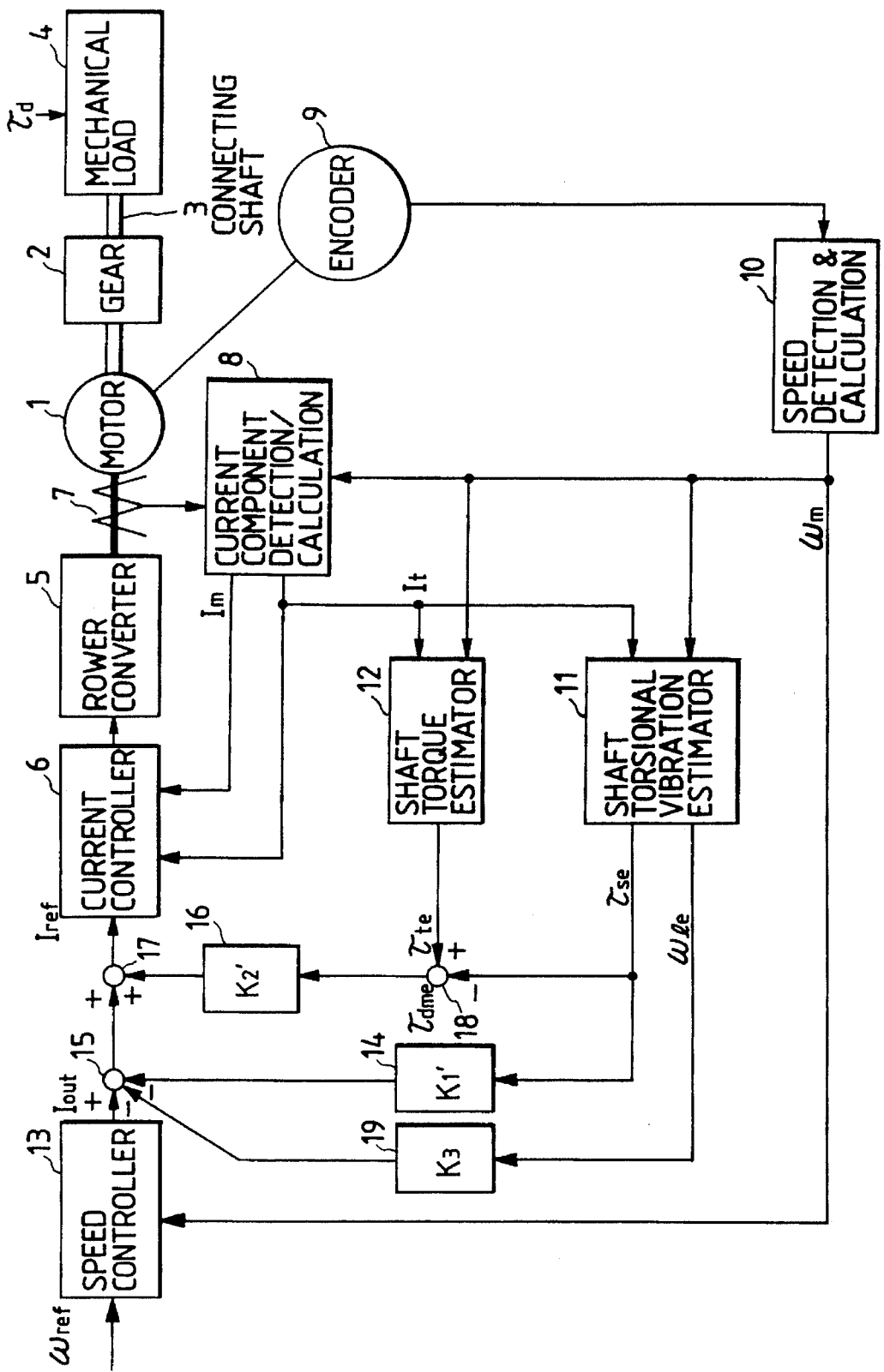
FIG. 10 is a block diagram of a motor speed control system of a fifth embodiment of the invention.

FIG. 10 shows a fifth embodiment according to the present invention. The difference from the fourth embodiment shown in FIG. 9 is that an adder 18 is added in the same way as in the third embodiment to calculate the disturbance shaft torque $\tau_{dem}$ which is the torque component due to the higher order vibration mode for compensation. Since the current command value is compensated with the disturbance shaft torque value $\tau_{dem}$ in addition to the compensation with the estimated shaft torque value $\tau_{le}$ and the estimated mechanical load speed value $\omega_{le}$, a vibration suppression control having a better response can be attained. The embodiment has advantages in that the adjustment of the compensating gain for suppressing the higher order vibration mode is easy and the shaft torsion vibration suppression having a quick response can be performed.

Figure 11:
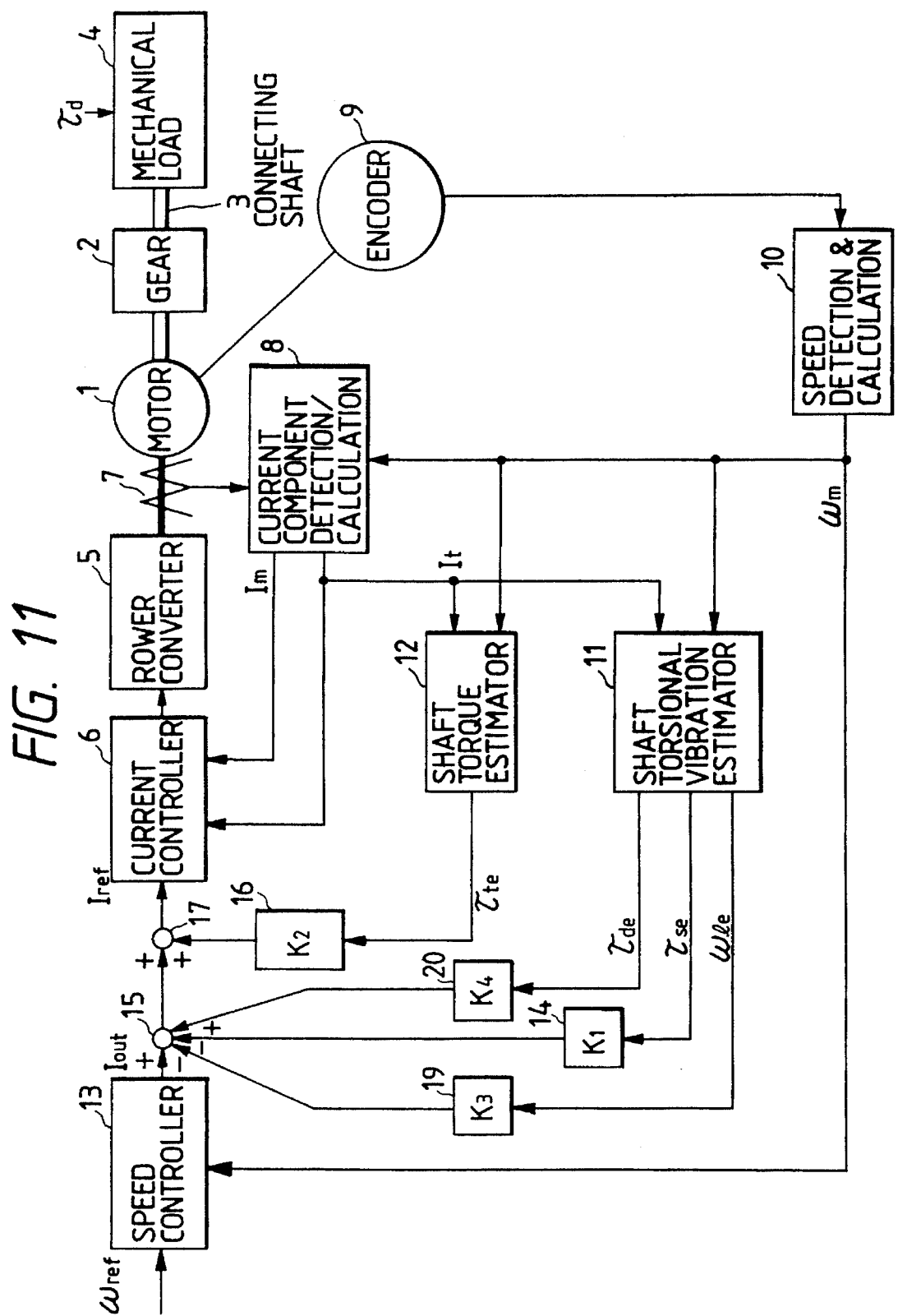
FIG. 11 is a block diagram of a motor speed control system of a sixth embodiment of the invention.

FIG. 11 shows a sixth embodiment according to the present invention. The difference from the fourth embodiment shown in FIG. 9 is that the current command value is compensated with the shaft torsion vibration estimator using the estimated value of the load torque acting on the mechanical load in addition to the shaft torsion torque and the estimated value for the mechanical load speed. Since the shaft torsion vibration estimator 11 estimates the vibration state based on the vibration model shown in FIG. 3, the load torque is also calculated at the same time with the other estimated values. The compensating gain $k_4$ is multiplied to the estimated load torque value $\tau_{de}$, and the result is added to the current command value. By this way, not only the vibration suppression but also the speed fluctuation at load torque addition can be suppressed. This embodiment has advantages in that the shaft torsion vibration of the mechanical load can be suppressed under condition of suppressing the higher order vibration mode, and at the same time the speed fluctuation due to the load torque can be decreased.

Figure 12:
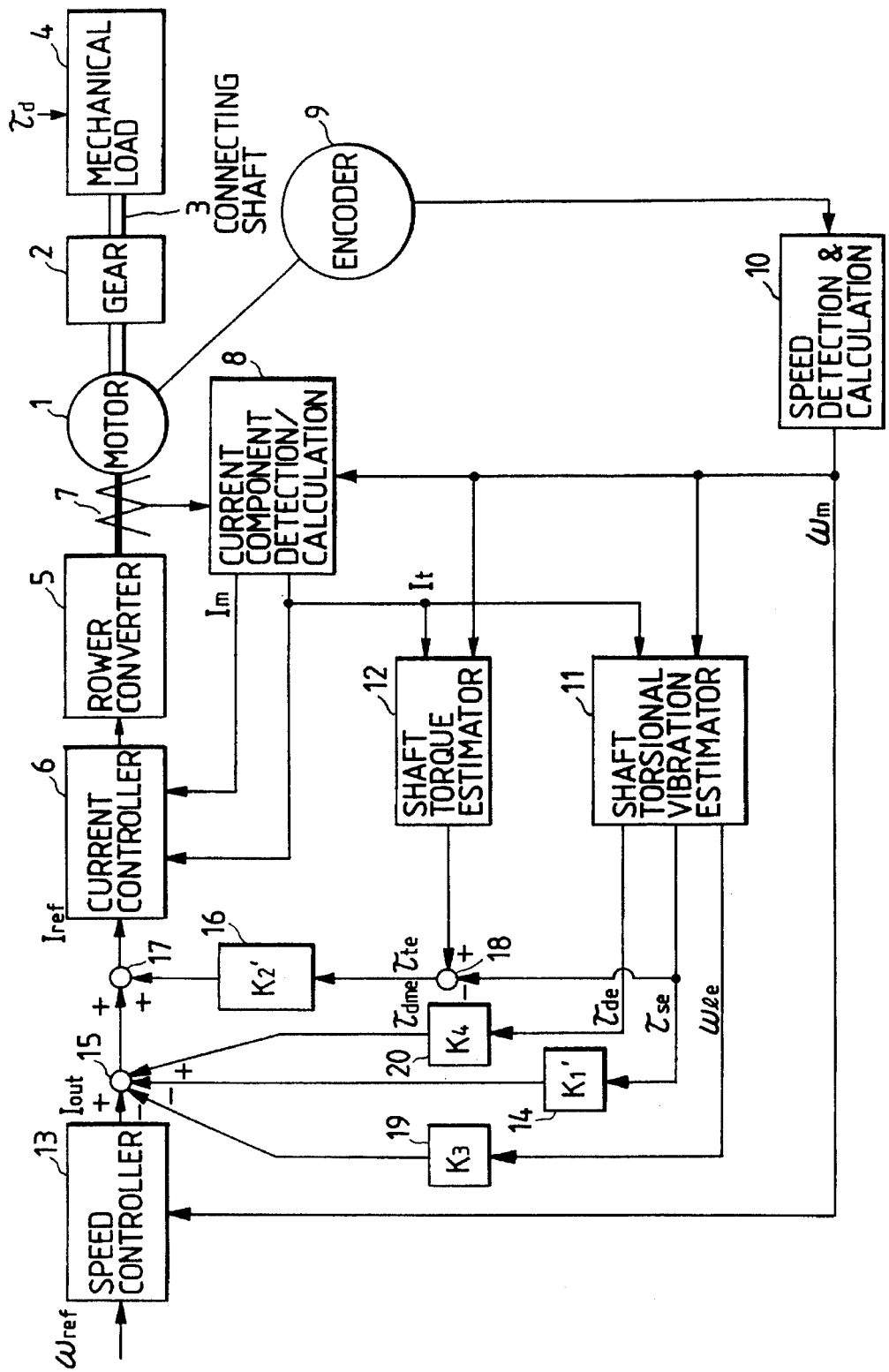
FIG. 12 is a block diagram of a motor speed control system of a seventh embodiment of the invention.

FIG. 12 shows a seventh embodiment according to the present invention. The difference from the sixth embodiment shown in FIG. 11 is that the disturbance shaft torque $\tau_{dem}$, which is the torque component due to the higher order vibration mode, is calculated for compensation with the adder 18 in the same way as in the third embodiment. The embodiment has an advantage in that each of the compensating gains for the shaft torsion vibration, the suppression of higher order vibration mode and the suppression of load torque can be separately adjusted.

Figure 13:
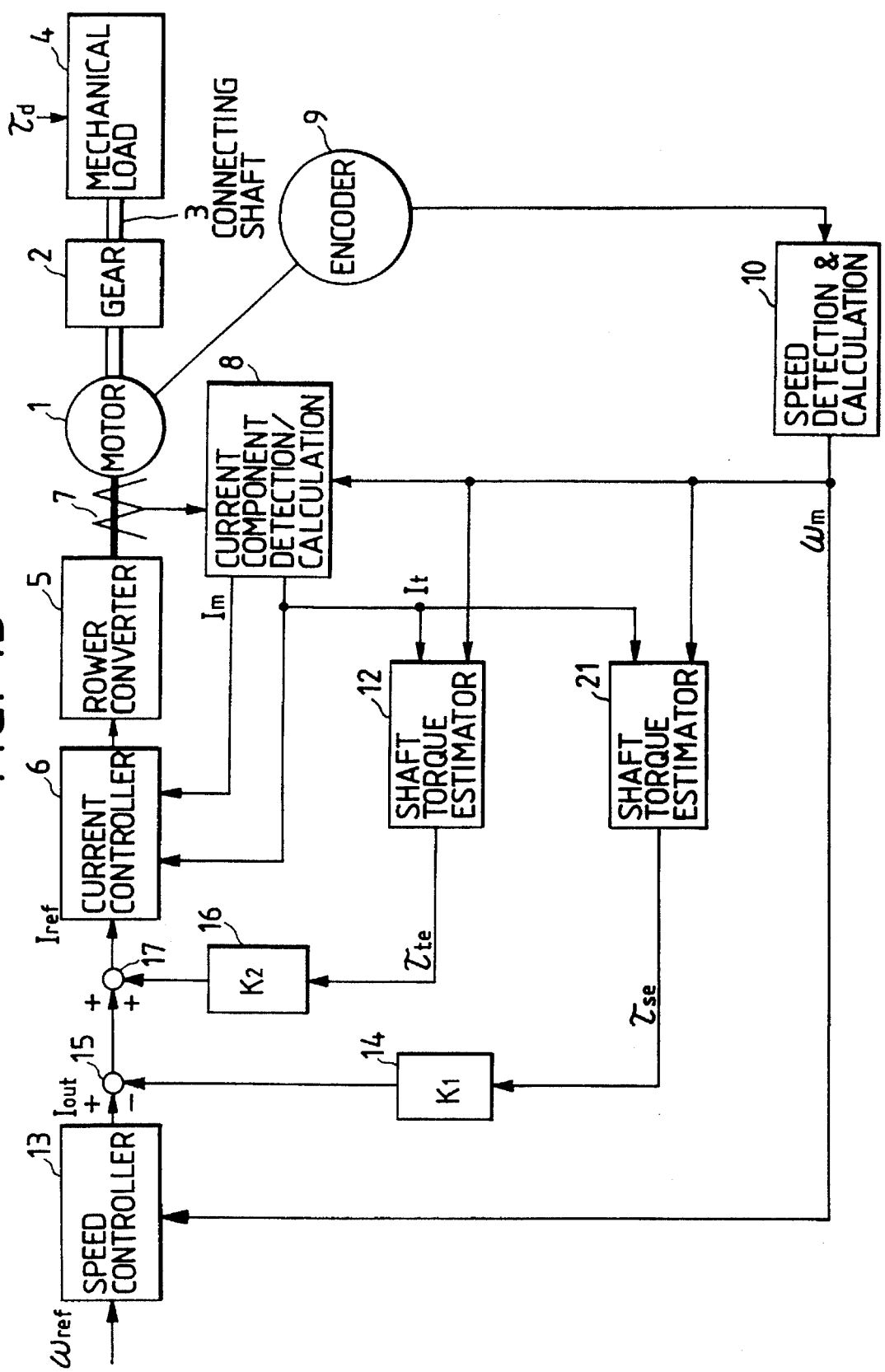
FIG. 13 is a block diagram of a motor speed control system of an eighth embodiment of the invention.
Figure 14:
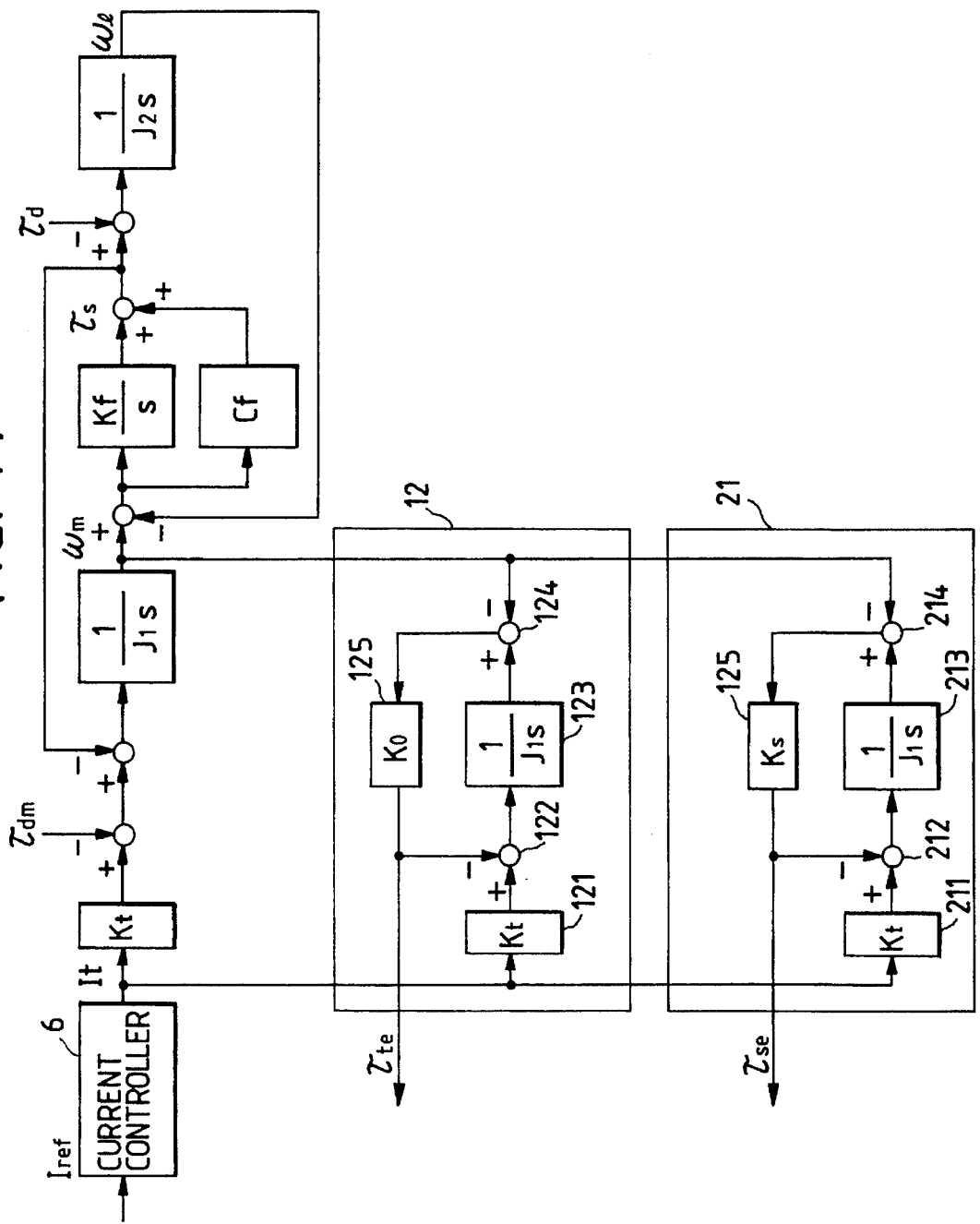
FIG. 14 is a block diagram showing the construction of a shaft torque estimator embodying the invention and FIG. 15 is a block diagram of a motor speed control system of a ninth embodiment of the invention.

FIG. 13 shows an eighth embodiment according to the present invention. The difference from the first embodiment shown in FIG. 1 is that there is provided a shaft torsion torque estimator 21 which estimates only the shaft torsion torque instead of the shaft torsion vibration estimator 11 based on the two mass system vibration model. FIG. 14 shows the construction of the shaft torsion torque estimator 21. The shaft torsion torque estimator 21 estimates the shaft torque independent from the motor torque current $I_t$ and the motor speed $\omega_m$ in the same way as the shaft torque estimator 12. That is, it can be understood that the shaft torque estimator 21 is a first shaft torque estimator and the shaft torque estimator 12 is a second shaft torque estimator. Further, when the shaft torque estimating gain in the shaft torque estimator 12 is $k_0$, the shaft torque estimating gain in the shaft torque estimator 21 is $k_s$. The shaft torque estimator 21 determines the shaft torque estimating characteristic as the product of this estimating gain and the integration gain $1/J_1$ in the integrator ($J_1$ is the moment of inertia in the motor side). That is, the shaft torque estimator 21 estimates the shaft torque over the angular frequency region of $k_s/J_1$ [rad/s], and the shaft torque estimator 21 estimates the shaft torque over the angular frequency of $k_0/j_1$ [rad/s]. The estimating gains $k_s$ and $k_0$ for the shaft torque estimators 21 and 12 are supposed to be set such as to satisfy the following equations.

[Equation 11]

$$k_s/J_1 \approx 2\pi \cdot f_{rs},$$

$$k_0 > k_s, \quad \text{(Equation 11)}$$

where $f_{rs}$ [Hz] denotes the resonant frequency of the shaft torsion vibration. That is, the first shaft torque estimator (shaft torque estimator 21) estimates the shaft torque in the frequency region up to the frequency of the shaft torsion vibration, and the second shaft torque estimator (shaft torque estimator 12) estimates the shaft torque in the frequency region above the frequency of the shaft torsion vibration. By means of setting the shaft torque in such manner, the shaft torque estimator 21 can estimate the shaft torsion torque due to the shaft torsion vibration between the motor and the mechanical load, and the shaft torsion vibration can be suppressed using the estimated torque value $\tau_{se}$. On the other hand, the shaft torque estimator 12 estimates not only the shaft torsion torque but also the torque component as $\tau_{te}$ including the vibration mode in the frequency higher than the shaft torsion vibration frequency. The current command value is compensated using the estimated shaft torsion torque value $\tau_{se}$ and the estimated shaft torque value $\tau_{te}$ in the same way as in the first embodiment. In this embodiment, there are provided the two shaft torque estimators which independently estimate the shaft torques. And with setting the estimating response in the different values, the shaft torque due to the shaft torsion vibration and the shaft torque due to higher order vibration mode can be separated and compensated. Therefore, this method has an advantage in that the vibration suppression control can be stably performed even when the control parameters vary since the shaft torsion torque can be estimated without using the two mass system vibration model.

Figure 15:
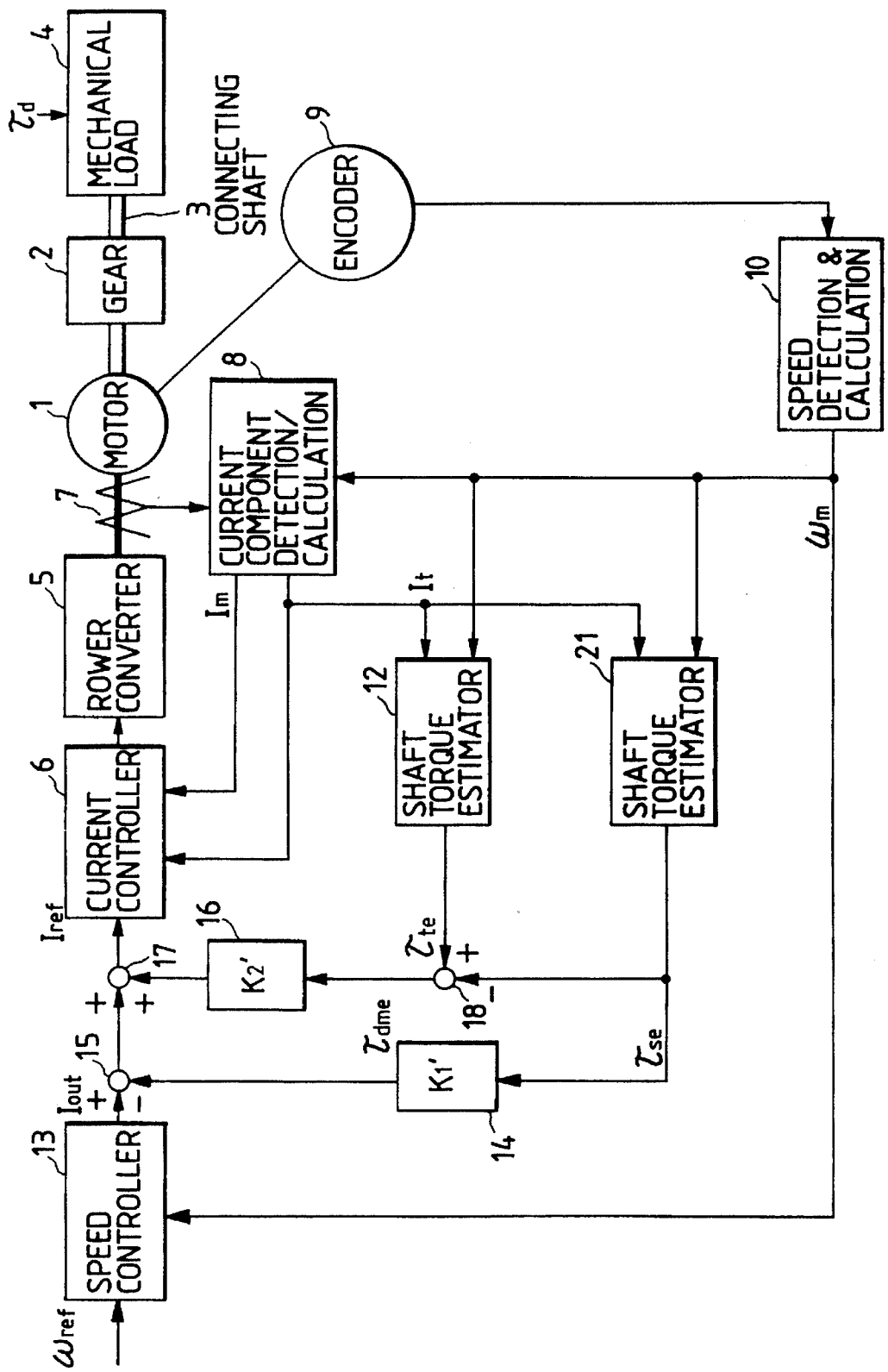

FIG. 15 shows a ninth embodiment according to the present invention. The difference from the eighth embodiment is that the disturbance shaft torque $\tau_{dem}$, which is the torque component due to higher order vibration mode, is calculated for compensation with the adder 18 in the same way as in the third embodiment. This embodiment has advantages in that the shaft torsion vibration and the higher order vibration mode can be suppressed with a simple construction which is a combination of two shaft torque estimators, and the adjustment of compensating gains can be easily performed.

According to the present invention, shaft vibration suppression having better response can be performed by means of individually suppressing each vibration mode, even when the motor driving system has not only the shaft torsion vibration but also the higher order vibration mode. Further, the estimated shaft torque value due to higher order vibration can be stably calculated as a disturbance torque component even when a plurality of higher order vibration peaks exist or the characteristics thereof change. Therefore, a robust vibration suppression control against the characteristic change in motor driving system can be attained by means of compensating the torque current command value using the estimated disturbance value calculated.

What is claim is:

1. In a motor speed controller for a motor for driving a mechanical load, which includes means for detecting a motor torque current and a motor speed an improvement comprising:

a shaft torsion vibration estimator for estimating a shaft torsion torque between the motor and the mechanical load the detected motor torque current and motor speed by using a two-mass system vibration model; and a shaft torque estimator for estimating a shaft torque acting on a motor shaft, said shaft torque estimator utilizing the detected motor torque current and motor speed;

wherein motor speed control is performed responsive to a speed command value, the detected motor speed and the estimated shaft torsion torque value calculated by the shaft torsion vibration estimator and the estimated shaft torque value calculated by the shaft torque estimator.

2. The improvement of claim 1, further comprising a difference detector calculating an estimated disturbance shaft torque value based on the difference between an estimated shaft torque value calculated by the shaft torque estimator and an estimated shaft torsion torque value calculated by the shaft torsion vibration estimator, wherein said motor speed control is performed in dependency upon the estimated disturbance shaft torque value calculated as an output from said difference detector, a speed command value, the detected motor speed and the estimated shaft torsion torque value.

3. The improvement of claim 1, wherein said shaft torsion vibration estimator further estimates a mechanical load velocity from the detected motor current and motor speed by using a two mass system vibration model, wherein the motor speed control is performed in dependency upon the speed command value, the detected motor speed, the estimated shaft torsion torque value, the estimated mechanical load velocity value calculated by the shaft torsion vibration estimator, and the estimated shaft torque value calculated by the shaft torque estimator.

4. The improvement of claim 2, wherein said shaft torsion vibration estimator further estimates a mechanical load velocity from the detected motor torque current and motor speed by using a two mass system vibration model, wherein the motor speed control is performed in dependency upon a speed command value, the detected motor speed, the estimated shaft torsion torque value, the estimated mechanical load velocity, and the estimated disturbance shaft torque value calculated as a difference between the calculated values of the estimated shaft torque value and the estimated shaft torsion torque value.

5. The improvement of claim 1, wherein the shaft torsion vibration estimator further estimates a mechanical load velocity and a load torque acting on the mechanical load from the detected motor torque current and motor space by using a two mass system vibration model, wherein the motor speed control is performed in dependency upon the speed command value, the detected motor speed, the estimated shaft torsion torque, the estimated mechanical load velocity, the estimated load torque value, and the estimated shaft torque value calculated by the shaft torque estimator.

6. The improvement of claim 2, wherein the shaft torsion vibration estimator further estimates a mechanical load velocity and a load torque acting on the mechanical load from the detected motor torque current and motor speed by using a two mass system vibration model, wherein the motor speed control is performed in dependency upon the speed command value, the detected motor speed, the estimated shaft torsion torque, the estimated mechanical load velocity value, the estimated load torque value, and the estimated disturbance shaft torque value calculated as a difference between the calculated values of the estimated shaft torque value and the estimated shaft torsion torque value.

7. The improvement of claim 1, wherein a speed control calculation is performed using the speed command value and the detected motor speed value, and an output of said speed control calculation is then compensated by the estimated value calculated by the shaft torsion vibration estimator and the estimated shaft torque value calculated by the shaft torque estimator wherein motor speed control is performed in accordance with a torque current command value which is obtained as a result of such compensation.

8. The improvement of claim 2, wherein a speed control calculation is performed using the speed command value and the detected motor speed value, and an output of said speed control calculation is then adjusted using the estimated value calculated by the shaft torsion vibration estimator and the estimated disturbance shaft torque value calculated as a difference between the estimated shaft torque value and the estimated shaft torsion torque value wherein motor speed control is performed using a torque current command value which is obtained as a result of such adjustment.

9. In a motor speed controller for a motor for driving a mechanical load which performs its motor speed control using a detected motor speed and a detected motor torque current, an improvement comprising:

a first shaft torque estimator and a second shaft torque estimator for estimating each shaft torque acting independently on a motor shaft using the detected torque current and the detected motor speed, with shaft torque estimation responses in the first and the second estimators being set to be different from each other wherein a motor speed control is performed using a speed command value, the detected motor speed value, the estimated first shaft torsion torque value calculated by the first shaft torque estimator, and the second estimated shaft torsion torque value calculated by the second shaft torque estimator.

10. The improvement of claim 9, further comprising means for calculating a difference between an estimated second shaft torsion torque value calculated by the second shaft torque estimator and an estimated first shaft torque value calculated by the first shaft torque estimator, wherein a speed control is performed using an estimated disturbance shaft torque value calculated as an output of said means for calculating and difference, the speed command value, the detected motor speed value, and the estimated first shaft torque value.

11. The improvement of claim 9, wherein a speed control calculation is performed using a speed command value and the detected motor speed value, with an output of the speed control calculation being compensated using the estimated shaft torsion torque value calculated by the first shaft torque estimator and the estimated shaft torque value calculated by the second shaft torque estimator, and wherein the speed control is performed in response to a torque current command value which is obtained as a result of such compensation.

12. The improvement of claim 10, wherein a speed control calculation is performed in using a speed command value and the detected motor speed value, with an output of said speed control calculation being compensated using an estimated disturbance shaft torque value calculated as a difference between the estimated second shaft torque value and the estimated first shaft torque value, wherein said speed control is performed in response to a torque current command value which is obtained as a result of such compensation.

\* \* \* \* \*

UNITED STATES PATENT AND TRADEMARK OFFICE
CERTIFICATE OF CORRECTION

PATENT NO. : 5,545,957  
DATED : August 13, 1996  
INVENTOR(S) : Kenji JUBO et al.

It is certified that error appears in the above-indentified patent and that said Letters Patent is hereby corrected as shown below:

| Column | Line | |
|---|---|---|
| 2 | 17 | Change "On" to --On--. |
| 3 | 24 | Before "speed" insert --show--. |
| 3 | 26 | Before "wave-form" insert --are--. |
| 4 | 15 | After "value" insert --$\omega_m$,--. |
| 4 | 61 | Move "[Equation 1]" from end of line 62 to the left margin of line 61. |
| 5 | 13 | Move "[Equation 3]" from end of line 14 to the left margin of line 13. |

UNITED STATES PATENT AND TRADEMARK OFFICE
CERTIFICATE OF CORRECTION

PATENT NO. : 5,545,957
DATED : August 13, 1996
INVENTOR(S) : Kenji KUBO et al.

It is certified that error appears in the above-indentified patent and that said Letters Patent is hereby corrected as shown below:

| Column | Line | |
|---|---|---|
| 5 | 34 | Move "[Equation 4]" from end of line 35 to the left margin of line 34. |
| 6 | 1 | Insert --[Equation 7]--. |
| 6 | 2 | At end of line, delete "[Equation 7]". |
| 6 | 37 | Change "ire" to --$\tau_{te}$--. |
| 6 | 38 | Delete "$\tau_{te}$". |
| 11 | 42 | Before "a motor speed" insert --means for detecting--. |
| 11 | 46 | After "load" insert --based on--; after "and" insert --the detected--. |
| 11 | 50 | After "and" insert --the detected--. |

UNITED STATES PATENT AND TRADEMARK OFFICE
CERTIFICATE OF CORRECTION

PATENT NO. : 5,545,957
DATED : August 13, 1996
INVENTOR(S) : Kenji KUBO et al.

It is certified that error appears in the above-indentified patent and that said Letters Patent is hereby corrected as shown below:

| Column | Line | |
|---|---|---|
| 12 | 5 | Before "motor speed" insert --the detected--. |
| 12 | 6 | Change "a" to --the--. |
| 12 | 14 | After "and" insert --the detected--. |
| 12 | 15 | Change "a" to --the--. |
| 12 | 27 | Change "a" to --the--. |
| 12 | 37 | After "and" insert --the detected--. |
| 12 | 38 | Change "a" to --the--. |
| 13 | 8 | After "a first shaft torque estimator" insert --for estimating a first shaft torque value--. |

UNITED STATES PATENT AND TRADEMARK OFFICE
CERTIFICATE OF CORRECTION

PATENT NO. : 5,545,957
DATED : August 13, 1996
INVENTOR(S) : Kenji KUBO et al.

It is certified that error appears in the above-indentified patent and that said Letters Patent is hereby corrected as shown below:

| Column | Line | |
|--------|------|---|
| 13 | 9 | Change "each shaft torque" to --a second shaft torsion torque value, each estimated value--. |
| 13 | 16 | Delete "torsion". |
| 13 | 21 | Change "an estimated" to --the estimated--. |
| 13 | 23 | Change "an estimated" to --the estimated--. |

Signed and Sealed this

Twenty-first Day of January, 1997

BRUCE LEHMAN

Attest:

Attesting Officer

Commissioner of Patents and Trademarks